(12) United States Patent
Hayes

(10) Patent No.: US 9,924,408 B1
(45) Date of Patent: Mar. 20, 2018

(54) METHODS AND DEVICES FOR INTERFERENCE CANCELLATION IN CELL SEARCH

(71) Applicant: Intel IP Corporation, Santa Clara, CA (US)

(72) Inventor: Matthew Hayes, Radebeul (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/245,195

(22) Filed: Aug. 24, 2016

(51) Int. Cl.
| H04B 1/00 | (2006.01) |
| H04W 28/04 | (2009.01) |
| H04W 56/00 | (2009.01) |
| H04W 48/16 | (2009.01) |
| H04W 24/08 | (2009.01) |

(52) U.S. Cl.
CPC ......... H04W 28/048 (2013.01); H04W 24/08 (2013.01); H04W 48/16 (2013.01); H04W 56/001 (2013.01)

(58) Field of Classification Search
CPC ... H04W 28/048; H04W 24/08; H04W 48/16; H04W 56/001
USPC ...................................................... 455/63.1
See application file for complete search history.

(56) References Cited

U.S. PATENT DOCUMENTS

| 6,785,513 | B1* | 8/2004 | Sivaprakasam | H04B 7/0617 455/11.1 |
| 7,522,883 | B2* | 4/2009 | Gebara | H04B 1/7103 385/100 |
| 7,929,593 | B2* | 4/2011 | Khayrallah | H04B 1/7105 375/148 |
| 8,150,326 | B2* | 4/2012 | Okello | H04B 7/0491 455/63.1 |
| 8,379,699 | B2* | 2/2013 | Smiley | H03F 1/3235 330/149 |
| 8,582,505 | B2* | 11/2013 | Luo | H04B 1/7107 370/328 |
| 8,761,317 | B2* | 6/2014 | Jonsson | H03M 13/2957 327/551 |
| 8,798,547 | B2* | 8/2014 | Xu | H04J 11/003 370/318 |
| 8,929,826 | B2* | 1/2015 | Siomina | G01S 5/00 342/360 |
| 8,995,592 | B2* | 3/2015 | Dao | H04J 11/004 375/316 |
| 2007/0060059 | A1* | 3/2007 | Kim | H04B 1/7103 455/63.1 |

(Continued)

Primary Examiner — April G Gonzales
(74) Attorney, Agent, or Firm — Viering, Jentschura & Partner mbB

(57) ABSTRACT

A method and communication device adapted for interference cancellation in a cell search used in a communication device, including: correlating a signal received at the communication device with a template comprising one or more signal sequences associated with one or more corresponding cells to determine a metric for each of the signal sequences; and at least one iteration of: ranking the signal sequences based on the determined metrics, wherein the highest ranked signal sequence is designated as an aggressor sequence; performing an interference cancellation to generate a corrected metric for signal sequences based on their correlation with the aggressor sequence; and removing the aggressor sequence and setting priority to the cell associated with the aggressor sequence.

25 Claims, 7 Drawing Sheets

(56) References Cited

U.S. PATENT DOCUMENTS

| | | | | |
|---|---|---|---|---|
| 2008/0240270 | A1* | 10/2008 | Coon | H04L 5/0094 375/260 |
| 2010/0190447 | A1* | 7/2010 | Agrawal | H04W 72/082 455/63.1 |
| 2010/0197231 | A1* | 8/2010 | Kenington | H04B 1/525 455/63.1 |
| 2010/0197233 | A1* | 8/2010 | Kim | H04B 1/7103 455/63.1 |
| 2011/0143672 | A1* | 6/2011 | Yoo | H04J 11/004 455/63.1 |
| 2011/0319025 | A1* | 12/2011 | Siomina | H04B 7/024 455/63.1 |
| 2012/0034926 | A1* | 2/2012 | Damnjanovic | H04B 7/022 455/450 |
| 2012/0108175 | A1* | 5/2012 | Luo | H04L 5/0007 455/63.1 |
| 2015/0065058 | A1* | 3/2015 | Wang | H04B 15/00 455/63.1 |

* cited by examiner

702 — Correlating a signal received at the communication device with a template comprising one or more signal sequences associated with one or more corresponding cells to determine a metric for each of the signal sequences 704 — Ranking the signal sequences based on the determined metrics, wherein the highest ranked signal sequence is designated as an aggressor sequence 706 — Performing an interference cancellation to generate a corrected metric for signal sequences based on their correlation with the aggressor sequence 708 — Removing the aggressor sequence and setting priority to the cell associated with the aggressor sequence

METHODS AND DEVICES FOR INTERFERENCE CANCELLATION IN CELL SEARCH

TECHNICAL FIELD

Various embodiments relate generally to methods and devices for wireless communications.

BACKGROUND

To detect new cells, a long term evolution (LTE) handset, i.e. a user equipment (UE), must perform cell search procedures. Cell search is used to gain time and frequency synchronization to the LTE base station, i.e. the evolved Node B (eNode B, eNB), and acquire system parameters such as the cell ID, duplex mode, and cyclic prefix length. eNBs, for example, broadcast Primary Synchronization Signals (PSSs) and Secondary Synchronization Signals (SSSs) to facilitate initial establishment of time and frequency synchronization in addition to cell-specific reference signals (CRSs) for time and frequency synchronization tracking. In other to achieve optimal system performance and to minimize coverage outage, the cell searching mechanism has to reliably detect new cells in low signal-to-interference-plus-noise ratio (SINR) conditions to facilitate re-selection and handover at the cell edge.

The concept of heterogeneous networks has been prevalent in the Third Generation Partnership Project (3GPP) Release 10 and subsequent releases. Heterogeneous networks deploy an overlay of small cells, e.g. picocells, with limited coverage within macro cells, e.g. LTE cells, to provide additional capacity and/or coverage to the overall network. To suppress the interference in a heterogeneous network, the concept of Enhanced-Inter-Cell-Interference. Coordination (eICIC) is introduced through the implementation of Almost Blank Subframes (ABS). However, in order to support Release 8 and 9 compliant devices, synchronization and physical broadcast channel (PBCH) signals are not suppressed and therefore must be decoded in hostile interference scenarios.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a flowchart in an aspect of this disclosure.

DESCRIPTION

Figure 1:
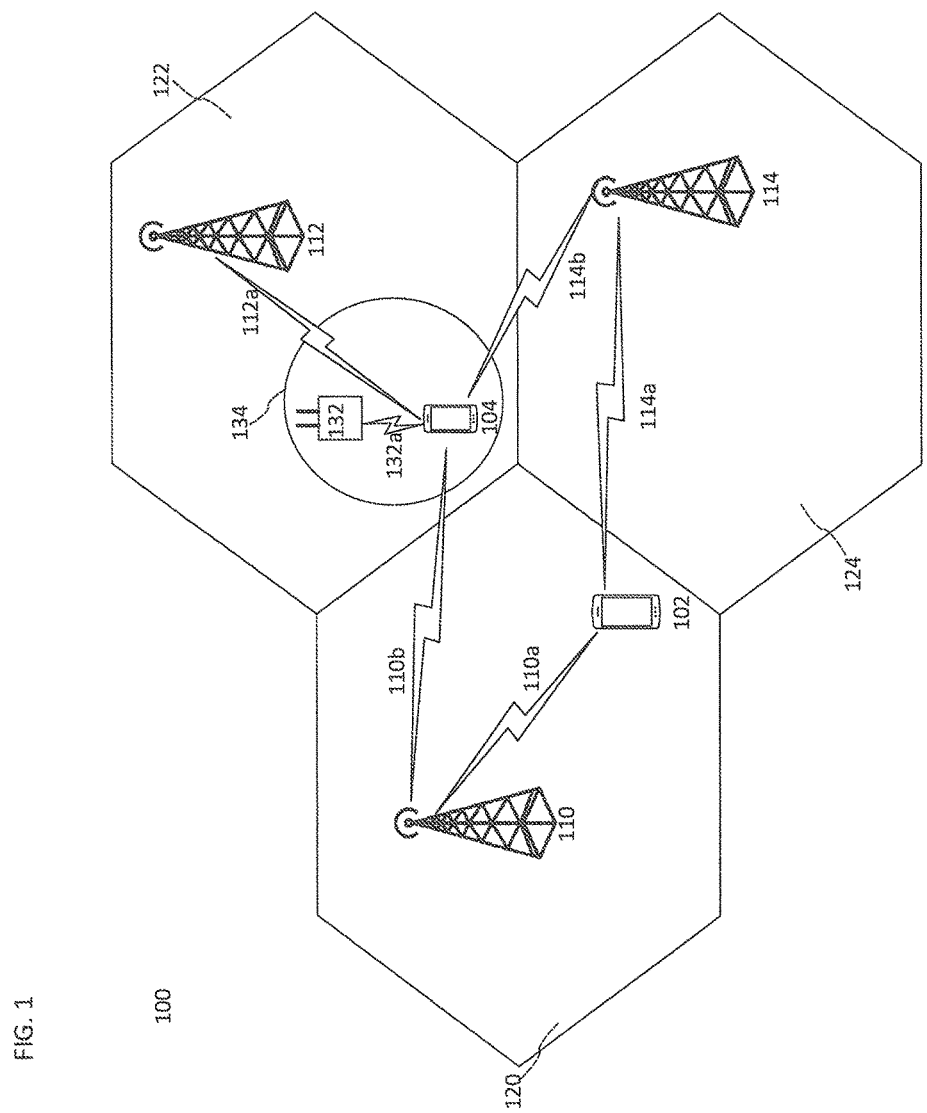
FIG. 1 shows a radio communication network.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard.

Furthermore, the term "cell" may be utilized to refer to any of a macrocell, microcell, picocell, or femtocell, etc.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

The search procedure in LTE is split into two phases. In the first phase, the UE detects the PSS to resolve the sector ID and timing acquisition to two possible hypothesis in a radio frame. In the second phase, the UE detects the SSS of target cells using the information acquired from the PSS. However, in eICIC scenarios, there may be multiple cells which are synchronized so that the PSS and SSS overlap.

The PSSs are based from Zadoff-Chu sequences, which have useful cross and auto-correlation properties, so interference between highly synchronized cells with different sector IDS is minimal. However, the SSSs, which are based from pseudorandom noise sequences, do not enjoy these properties. In the presence of a strong aggressor cell, therefore, it is feasible that there will be false detections associated with other highly correlated SSSs.

Cells in eICIC cooperation transmit SSSs blindly without taking into consideration interference mitigation via coordination. As a result, the different sequences will interfere with each other since they are highly likely to overlap due to tight time constraints.

The subject matter of this disclosure presents a Parallel Interference Cancellation (PIC) scheme for cell detection in interference dominated scenarios by utilizing fast-correlation in the frequency domain and correlation properties between SSSs. This enables the detection of weak cells through cancellation and mitigates false detections by removing cell hypothesis in the search of SSS that are highly correlated to real cells visible to the UE.

The PIC scheme in this disclosure is adopted in order to achieve greater processing speeds. SSS correlations are pre-computed and techniques are presented to determine the correlation matrix. This disclosure is particularly suited to a Software Defined Radio (SDR) solution wherein the algorithm/process described herein is implemented in firmware.

FIG. 1 shows a diagram of radio communication network 100, e.g. an LTE network, containing mobile terminals 102 and 104, i.e. UEs, and base stations 110-114. Each of base stations 110-114 may be an LTE base station (i.e. eNB) and serve the corresponding cells 120-124, which may be sectorized, i.e. composed of multiple LTE cells. It is appreciated that while cells 120-124 (and small cell 134) are shown as having distinct boundaries, the coverage areas of each of the cells may overlap.

Small cell 134 may be a femtocell or a picocell, e.g. a closed subscriber group (CSG), and located within the coverage region of base station 112. A low power station 132 provides small cell 134 with access to radio communication network 100.

The unique radio channels between each of base stations 110-114 and low power station 132 and UEs 102-104 may be respectively denoted as radio channels 110a-b, 112a, 114a-b, and 132a, as depicted in FIG. 1.

Depending on the operational status of UEs 102-104, UEs 102-104 may exchange uplink and/or downlink data with one or more of cells 120, 122, 124, and 132. For example, UE 102 may be connected with cell 120 of base station 110 (in a radio connected state) and may thus transmit and receive data with cell 120 over radio channel 110a. One or both of UE 102 and 120 may additionally be configured according to a Multiple Input Multiple Output (MIMO) transmission scheme, in which case radio channel 110a may be further divided into a plurality of MIMO channels that each correspond to the unique path between a given transmit antenna (corresponding to a transmit antenna port) of cell 120 and a given receive antenna (corresponding to a receive antenna port) of UE 102.

In order to support radio communications between UE 102 and cell 120, for example, UE 102 needs to maintain time and frequency synchronization with cell 120. In terms of time synchronization, UE 102 may need to remain aligned with the data symbol boundaries in the timing schedule used by cell 120. In terms of frequency synchronization, UE 102 may need to tune its receiver to the correct carrier frequency that matches the transmitter base station 110 in order to receive downlink radio signals or send signals in the uplink direction.

In the context of LTE as specified by the $3^{rd}$ Generation Partnership Project (3GPP), LTE cells may perform downlink transmissions according to 10 ms radio frames that are each divided into 10 subframes of 1 ms duration each, i.e. 10 Transmission Time Intervals (TTI). Each subframe may be further divided into two slots of 0.5 ms duration each. Each slot is further divided into 6 or 7 symbols each, depending on the Cyclic Prefix (CP) length, where each symbol period may contain one Orthogonal Frequency Division Multiplexing (OFDM) symbol per subcarrier.

The LTE system bandwidth may be split into a plurality of evenly-spaced subcarriers, which as noted above may each carry a single OFDM symbol per symbol period. Each symbol period per subcarrier may be defined as a Resource Element (RE), and accordingly each RE (per antenna port) may hold a single OFDM symbol. REs may be further grouped into Resource Blocks (RB), which is a time-frequency block spanning one slot (6 or 7 symbols) and 12 subcarriers (180 kHz), e.g. a block of 84 REs for normal CP.

The first step for a UE, e.g. UE 102, to camp on a cell, e.g. cell 120, is to perform a cell synchronization. Once synchronized, the UE can acquire the cell ID, time slot, and frame synchronization, from which the UE will be able to read system information blocks from a network. UE commences the cell synchronization process by tuning into different frequency channels. Once the UE is tuned to the frequency channel of the appropriate cell, e.g. once UE 102 is tuned to the frequency channel of cell 120, the UE will receive the PSS which is located in the last OFDM symbol of the first time slot in the first subframe (i.e. subframe 0) and is repeated in subframe 5. From the PSS, the UE is synchronized on the subframe level and is also able to obtain the physical layer identity, from 0-2. A more detailed explanation of the LTE downlink frame structure is given in FIG. 2.

After receiving the PSS, the UE searches for the SSS, which is located in the same subframe as the PSS. From the SSS, the UE obtains the physical layer cell identity group number, from 0-167. Using the physical layer identity received from the PSS and the physical layer cell identity group number received from the SSS, the UE is able to determine the physical cell ID for the cell, from which the UE may determine the location of cell reference signals used in channel estimation, cell selection or reselection, and cell handover procedures.

However, because cells 120-124 and 134 in radio communication network 100 transmit the SSSs blindly without taking into consideration interference from other cells via coordination, the different SSS sequences will interfere with each other.

Several interference scenarios may arise in network 100. In a first example, interference from base station 114 may interfere with UE 102 when attempting to receive/transmit with base station 110. Also, in receiving SSS signals, the SSS from base station 110 may interfere and "leak" into an SSS sent from base station 114. In this case, cell 120 can be seen as an "aggressor cell," and it is feasible that there will be false detections associated with other highly correlated SSS.

As shown in FIG. 1, radio access networks contain different layers of cells, such as macrocells (e.g. cells 120-124) and smaller cells, such as femtocells, microcells, and picocells (e.g. depicted by cell 134). Such networks are described as heterogeneous networks, which may suffer from two types of interference problems. The first is when a high-power base station, e.g. 110-114, of a macrocell is close to a low-power base station, e.g. 132, of a smaller cell, such as a picocell, femtocell, etc. Interference from the macrocell reduces the picocell's effective coverage area. In this case, the macrocell is the aggressor cell and the smaller cell is the victim cell. The second interference problem occurs if the picocell belongs to a closed subscriber group (CSG). A UE nearby the CSG cell may not be able to effectively communicate with the macrocell base station, such as base station 112, due to the interference from the CSG station 132. In this case, the smaller cell is the aggressor cell and the macrocell is the victim cell.

In an example of another interface dominated scenario, UE 104 may be in a position in which it receives signals 110b, 112a, and 114b from base stations 110, 112, and 114, respectively, and signal 132a from small power station 132. In such case, since the synchronization signals are transmitted blindly, and because SSS sequences do not have the correlation properties of PSS sequences, UE 104 may struggle to identify the physical layer cell identity group numbers of any of the respective cells. Additionally, UE 104 may falsely detect the physical layer cell identity group numbers closely associated with that of an aggressor cell's physical layer cell identity group number.

Starting with Release 10, these interference issues were mitigated using eICIC, wherein the aggressor cell utilizes almost blank subframes (ABSs) in order to reduce interference with the victim cell. With the ABS, the aggressor cell transmits the minimum required information required for compatibility with Releases 8 and 9, e.g. reference signals, synchronization signals, and different physical channel indicators, such as the physical control format indicator channel (PCFICH) and the physical hybrid-ARQ indicator channel (PHICH). The aggressor cell will not schedule other information, such as physical downlink control channel (PDCCH) and physical downlink shared channel (PDSCH), in the ABSs.

While the eICIC scheme mitigates interference for the most part, the synchronization signals (such as PSSs and SSSs) and PBCH signals are not suppressed and are therefore decoded in high interference situations.

Figure 2:
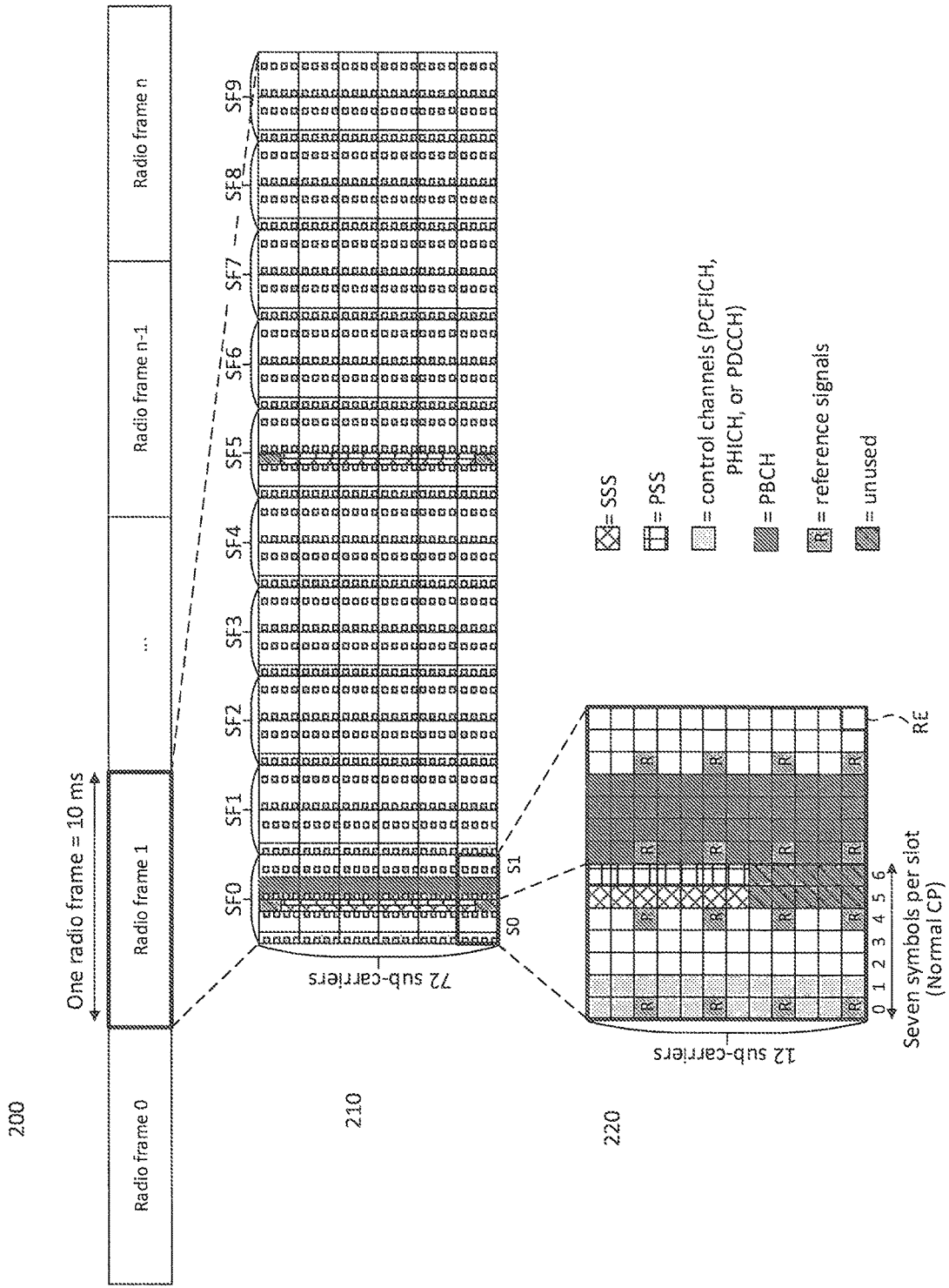
FIG. 2 shows a diagram containing the PSS and SSS.

FIG. 2 shows an exemplary LTE downlink radio frame structure 200. It is appreciated that radio frame structure 200 is exemplary in nature and may thus be simplified for purposes of this explanation.

An LTE radio frame is 10 ms in duration and is divided into ten subframes (SF0, SF1, SF9) of 1 ms each 210. Each subframe is further divided into two slots of 0.5 ms each, e.g. slot 0 (S0) and slot 1 (S1) in SF0. Each slot is further divided into either six or seven symbols, depending on the cyclic prefix (CP) length. The CP is inserted at the beginning of each symbol in order to combat inter-symbol interference (not shown). If a normal CP is used, then each slot has seven symbols (as shown in 220 in FIG. 2). If an extended CP is used, then each slot contains six symbols (not shown). The radio frames are used to send system information between the UE and the eNB, while subframes facilitate resource allocation and slots are useful for synchronization.

In LTE, radio resources are allocated in Physical Resource Blocks (PRB). Each PRB contains 12 subcarriers and one slot. For example, if a normal CP is used, a PRB will contain 12 subcarriers transmitted over seven symbols. FIG. 2 shows the minimum number of subcarriers necessary to comply with the LTE bandwidth requirements, i.e. 72 sub-subcarriers.

Two PRBs in the first subframe (SF0) are demonstrated in the blown up section 220 of FIG. 2, i.e. twelve subcarriers across two slots (S0 and S1). As demonstrated in 220, Resource Elements (REs) are allocated for reference signals in the downlink radio frame structure. In radio frame structure 200, the reference signals are allocated REs in the first and fifth symbols of every slot every third subcarrier.

The rest of the REs in the first group of symbols (in 200, symbols 0 and 1) of every subframe which are not allocated to reference signals are allocated to control channel signaling, i.e. the PDCCH, PDCFICH, and PHICH. Additionally, the sixth and seventh symbols of the first slot in the first subframe (SF0) and the sixth subframe (SF5) are dedicated to the primary synchronization signal (PSS) and the secondary synchronization signal (SSS). The PSS and the SSS are spread across the middle 62 sub-carriers of the LTE radio frame, thereby leaving unused sub-carriers on each end. Finally, the first four symbols of the second slot (S1) of the first subframe (SF0) in each radio frame are allocated to the Physical Broadcast Channel (PBCH). The rest of the resource elements, which in FIG. 2 are shown as the white blocks, may be available for transmission of data, e.g. on the Physical Downlink Shared Channel (PDSCH).

Within this disclosure, it is assumed that the UE can detect the PSS of a cluster of interfering cells, and, therefore, the UE is able to obtain the sector ID and timing without error. The received signal in the frequency domain can then be represented by:

$$y = \sum_{i=0}^{N-1} h_i S_j + n \qquad (1)$$

where y is the 62×1 observation vector, $h_i$ is the flat-fading channel associated with the ith cell, $S_j$ us the jth column of the 62×168 SSS sequence matrix S which defines all SSS sequences (i.e. 168) associated with a particular sector ID (since the PSS has already been received) and n is the 62×1 noise vector. In matrix/vector notation, Equation (1) may be shown as:

$$Y = \tilde{S}h + n \qquad (2)$$

where Y is the 62×1 observation vector, h is the diagonal N×1 flat-fading channel associated with the ith element associated with the ith cell, S is a 62×N matrix of the transmitted SSS sequences and n is the 62×1 noise vector. Note that there is a unique one-to-one mapping between indexes of cell i and SSS sequence j.

Assuming fast correlation in the frequency domain the cell search metric z is derived as:

$$z = S^H y \quad (3)$$

where z is the 168×1 decision metric with the ith element associated with the inner product of the ith sequence and the observation sequence. Because the SSS sequences are not orthogonal, the energy from an aggressor cell can leak into the SSS decision matrix sequences that have a correlation factor greater than zero with the aggressor cell. If the cells associated with these correlated SSS sequences are not present, then without additional signal processing, there is a risk of false detections.

Figure 3:
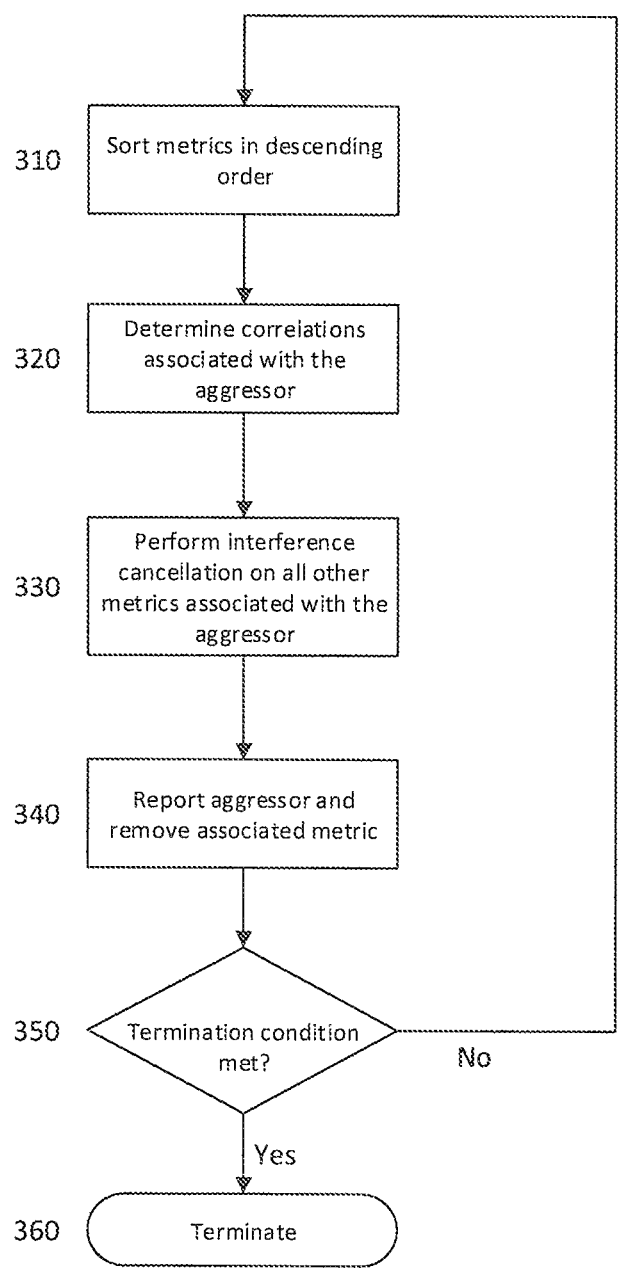
FIG. 3 shows a flowchart describing the Parallel Interference Cancellation (PIC) method in an aspect of this disclosure.

FIG. 3 shows a flowchart 300 outlining the search parallel interference algorithm in an aspect of this disclosure. It is appreciated that flowchart 300 is exemplary in nature and may thus be simplified for purposes of this explanation.

First, the search metrics z are sorted according to the highest magnitude 310, i.e. |z|, to yield the order of the metrics. The search metrics z are calculated according to Equation (3).

The correlations associated with the aggressor are then determined 320. In an aspect of this disclosure, the correlation matrix, $\Sigma = S^H S$, may be calculated off-line and stored in a memory component of the communication device, i.e. UE. Then, the column of the matrix needs to be selected according to the highest metric, indicating the aggressor. The column may be sorted using the same permutation that ordered the metrics in 310.

After identifying the aggressor, interference cancellation is performed on all other metrics associated with the aggressor 330. The aggressor may cancel its energy from the other metrics according to the correlation coefficients between the respective signal sequences, $$z_i = z_i - \Sigma_{i,j} z_j \quad (4)$$

The aggressor cell is then reported and its associated data, i.e. its metric, correlation matrix column, etc, is removed 340. In an alternate embodiment of this disclosure, the removal of the aggressor cell and its associated data may occur prior to the performance of the inference cancellation shown in 330, i.e. the aggressor and its associated data may be removed prior to the interference cancellation (i.e. energy from the aggressor metric).

After the aggressor metric has been removed/the interference cancellation has been performed, the algorithm determines whether a termination condition has been met 350. This termination condition may be a predetermined termination condition, e.g. an indication to run the algorithm for N number of loops, where N is an integer greater than zero. For example, the predetermined number of loops (i.e. iterations) may be about 20, or 15, or 10, or 5, or less, but must be greater than 0.

If the termination condition has not been met, the process loops back to sort the remaining metrics in descending order 310 as the order may have changed due to the interference cancellation. For example, one of the metrics closely associated with the aggressor may have been falsely reported as being high since the aggressor's "energy" may have "leaked" into it, and, as a result, after the interference cancellation, this metric may be relegated to a lower position.

If the termination condition is met, the process is terminated 360.

For exemplary purposes, a simplified explanation of the process detailed in flowchart 300 is presented below. In this example, only 5 templates (A-E) are used.

Prior to implementing the process described in flowchart 300, a correlation between each of the templates A-E is performed and stored in a memory component which can be accessed by the communication device (i.e. may be on the device, or at a location which is remotely accessible by the device). After receiving a signal, the device correlates each of its templates, A-E, to the received signal in order to obtain a metric for each template. In this example, the calculated metrics are as follows: A=10, B=9, C=7, D=4, and E=3.

The metrics are then ranked in descending order, i.e. A, B, C, D, and E.

Next, the correlations associated with each template to the aggressor (demonstrated by the template with the highest metric), in this case, A, are identified from the previously performed correlations between each of the templates A-E. In this example, the correlation between each template to template A is as follows: B to A is 0.9, C to A is 0.7, D to A is 0.1, and E to A is 0.2.

The interference cancellation is performed using Equation (4). In order to calculate the corrected metric for each template, we subtract the effect of the "aggressor" metric with the other metrics, i.e. subtract the product of the "aggressor" metric value and the correlation with the "aggressor."

For example, since the correlation between B and A was 0.9, we can determine that the corrected (i.e.) metric for template B (once the interference cancellation is performed) is 0, i.e. B_new=B−A*Z(A,B)=9−10*0.9; the corrected metric for template C is 0, i.e. C_new=C−A*Z(A,C)=7−10*0.7; the corrected metric for template D is 3, i.e. D_new=D−A*Z(A,D)=4−10*0.1; and the corrected metric for template E is 1, E_new=E−A*Z(A,E)=i.e. 3−10*0.2, where Z(A,i) is the correlation of template i with A.

We then report the "aggressor" A as a detected cell and removed the associated signal sequence/metric, i.e. template A and it's metric of 10. If the termination condition has not been met, we sort the corrected metrics (i.e. the new metrics) in descending order and repeat the process, i.e. the new order will be template D (D_new=3); template E (E_new=1); and then templates B and C with values of 0. For this second iteration, the "aggressor" is D, so the correlation between D and the other templates is used in the interference cancellation, in this example, only the correlation with E is needed. If a correlation of 0.33 is assumed, then the final metric for E can be calculated as E_final=E_new−D_new*Z(DE)=1−3*0.33≈0.

As a result, our final rankings are template A (with a metric of 10); template D (with a final value of 3); and the three remaining templates with a final value of 0. Accordingly, only cells associated with templates A and D are reported even though in the initial rankings D was fourth.

Figure 4:
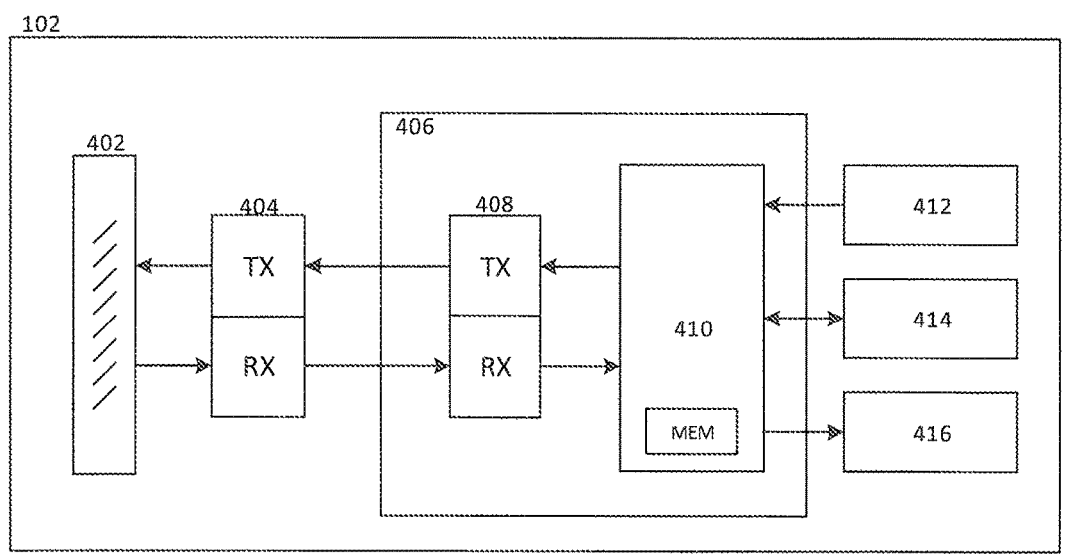
FIG. 4 shows an internal configuration of a mobile terminal.

FIG. 4 shows an internal configuration of communication device, e.g. UE 102, which may be configured to perform the joint time and frequency offset estimation procedure of this disclosure. As shown in FIG. 4, UE 102 may include antenna system 402, radio frequency (RF) transceiver 404, baseband modem 406 (including physical layer processing circuit 408 and controller 410), data source 412, memory 414, and data sink 416. Although not explicitly shown in FIG. 4, mobile terminal 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 102 may transmit and receive radio signals on one or more radio access networks. Baseband modem 406 may direct such communication functionality of UE 102 according to the communication protocols associated with each radio access network, and may execute control over antenna system 402 and RF transceiver 404 in order to transmit and receive radio signals according to the formatting and scheduling parameters defined by each communication protocol.

UE 102 may transmit and receive radio signals with antenna system 402, which may be a single antenna or an antenna array composed of multiple antennas and may additionally include analog antenna combination and/or beamforming circuitry. In the receive path (RX), RF transceiver 404 may receive analog radio frequency signals from antenna system 402 and perform analog and digital RF front-end processing on the analog radio frequency signals to produce digital baseband samples (e.g. In-Phase/Quadrature (IQ) samples) to provide to baseband modem 406. RF transceiver 404 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 404 may receive digital baseband samples from baseband modem 406 and perform analog and digital RF front-end processing on the digital baseband samples to produce analog radio frequency signals to provide to antenna system 402 for wireless transmission. RF transceiver 404 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 406 to produce the analog radio frequency signals for wireless transmission by antenna system 402. Baseband modem 406 may control the RF transmission and reception of RF transceiver 404, including specifying transmit and receive radio frequencies for operation of RF transceiver 404.

As shown in FIG. 4, baseband modem 406 may include physical layer processing circuit 408, which may perform physical layer (Layer 1) transmission and reception processing to prepare outgoing transmit data provided by controller 410 for transmission via RF transceiver 404 and prepare incoming received data provided by RF transceiver 404 for processing by controller 410. Physical layer processing circuit 410 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 408 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 4, physical layer processing circuit 408 may include a control circuit such as a processor configured to control the various hardware and software processing components of physical layer processing circuit 408 in accordance with physical layer control logic defined by the communications protocol for the relevant radio access technologies. Furthermore, while physical layer processing circuit 408 is depicted as a single component in FIG. 4, physical layer processing circuit 408 may be collectively composed separate sections of physical layer processing circuitry where each respective section is dedicated to the physical layer processing of a particular radio access technology.

UE 102 may be configured to operate according to one or more radio access technologies, which may be directed by controller 410. Controller 410 may thus be responsible for controlling the radio communication components of mobile terminal 102 (antenna system 402, RF transceiver 404, and physical layer processing circuit 408) in accordance with the communication protocols of each supported radio access technology, and accordingly may represent the Access Stratum and Non-Access Stratum (NAS) (also encompassing Layer 2 and Layer 3) of each supported radio access technology. Controller 410 may be structurally embodied as a protocol processor configured to execute protocol software (retrieved from controller memory MEM as shown in FIG. 4) and subsequently control the radio communication components of mobile terminal 102 in order to transmit and receive communication signals in accordance with the corresponding protocol control logic defined in the protocol software.

Controller 410 may therefore be configured to manage the radio communication functionality of UE 102 in order to communicate with the various radio and core network components of radio communication network 100, and accordingly may be configured according to the communication protocols for both the LTE network and the GSM/UMTS legacy network. Controller 410 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 410 may be responsible for directing radio communication activity of UE 102 according to the communication protocols of the LTE and legacy networks. As previously noted regarding physical layer processing circuit 408, one or both of antenna system 402 and RF transceiver 404 may similarly be partitioned into multiple dedicated components that each respectively correspond to one or more of the supported radio access technologies. Depending on the specifics of each such configuration and the number of supported radio access technologies, controller 410 may be configured to control the radio communication operations of UE 102 in accordance with a master/slave RAT hierarchical or multi-SIM scheme.

UE 102 may further comprise data source 412, memory 414, and data sink 416, where data source 412 may include sources of communication data above controller 410 (i.e. above the NAS/Layer 3) and data sink 416 may include destinations of communication data above controller 410 (i.e. above the NAS/Layer 3). Such may include, for example, an application processor of UE 102, which may be configured to execute various applications and/or programs of UE 102 at an application layer of UE 102, such as e.g. an Operating System (OS), a User Interface (UI) for supporting user interaction with UE 102, and/or various user applications. The application processor may interface with baseband modem 406 (as data source 412/data sink 416) as an application layer to transmit and receive user data such as voice data, audio/video/image data, messaging data, application data, basic Internet/web access data, etc., over a the radio network connection(s) provided by baseband modem

406. Data source 412 and data sink 416 may additionally represent various user input/output devices of UE 102, such as display(s), keypad(s), touchscreen(s), speaker(s), external button(s), camera(s), microphone(s), etc., which may allow a user of mobile terminal 102 to control various communication functions of mobile terminal 102 associated with user data.

Memory 414 may embody a memory component of UE 102, such as e.g. a hard drive or another such permanent memory device. Although not explicitly depicted in FIG. 4, the various other components of UE 102 shown in FIG. 4 may additionally each include integrated permanent and non-permanent memory components, such as for storing software program code, buffering data, etc.

The baseband modem 406 may be configured to implement any of the processes and methods described herein, e.g. the process described by FIG. 3 and its corresponding description.

Figure 5:
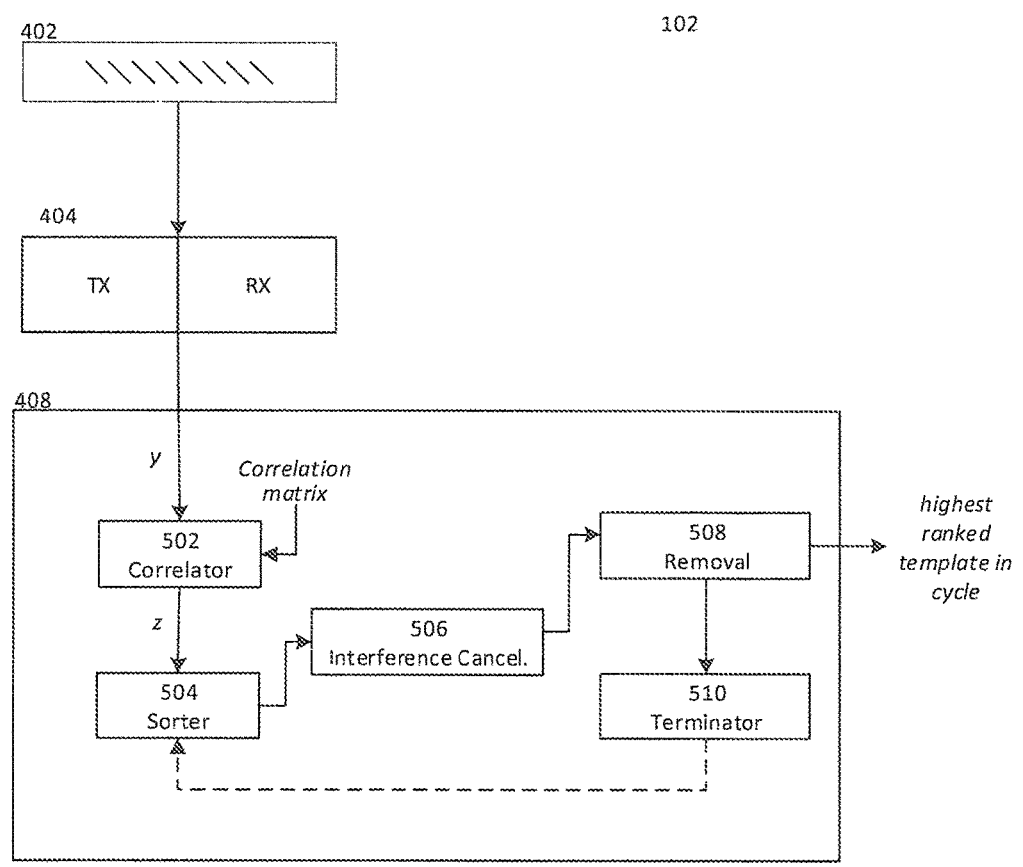
FIG. 5 shows a circuit configuration of a mobile terminal.

FIG. 5 shows an internal diagram of UE 102 depicting the components related to the procedure of this disclosure. Accordingly, the illustrated depiction of FIG. 5 may omit certain components of UE 102 that are not directly related to the Parallel Interference Cancellation (PIC) described herein. Additionally, components depicted as being separate in FIG. 5 may be incorporated into a single, hybrid component that performs the same functions as the separate components, and, similarly, single components may be split into two or more separate components that perform the same function as the single component.

As shown in FIG. 5, the physical layer processing circuit 408 may include PIC circuitry, which may include a correlator circuit 502, a sorter circuit 504, an interference cancellation circuit 506, a reporter/removal circuit 508, and a termination evaluation circuit 510. Each of the aforementioned components of circuitry may be structurally realized as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Skilled persons will appreciate the possibility to embody each component of PIC circuitry in hardware and/or software according to the functionality detailed herein.

As detailed in an aspect of this disclosure, PIC circuitry may be a circuit arrangement comprising a correlator circuit 502 configured to correlate an observation vector (i.e. observed signal, y) with a correlation matrix, e.g. the SSS sequence matrix, to produce a decision metric, z; a sorting circuit 504 configured to sort the metrics of the correlation in descending order; an interference cancellation circuit 506 configured to cancel the energy of the aggressor that leaked into victim metrics; a removal circuit 508 configured to remove the data associated with the aggressor cell (i.e. the highest ranked template/metric in the cycle) from the decision matrix for the possible next iteration; and terminator circuit 510 configured to evaluate whether a termination condition has been met in order to terminate the process. If the termination condition has not been met, the sorting circuit 504 sorts the remaining metrics (after the aggressor cell metrics have been removed and the interference cancellation has been performed) in descending order and the process is repeated.

Correlation circuit 502 may be configured in at least one of the following embodiments. In a first embodiment, the correlations between the templates can be calculated offline (for example, in a base correlation determination circuit, not pictured) and stored in a memory component which the device can access. In a second embodiment, only high correlation template values can be stored in order to minimize the size of the correlation matrix that needs to be stored. For example, only the templates with the highest X correlation values are stored, where X is any number less than the total number of correlations in the comprehensive 168×168 correlation matrix. In this case, there may be some performance loss since the correlation matrix is not as extensive as in the first embodiment. In another example, only the templates with the highest 84, or 42, or 21 or any number less than 84, correlation values are stored. In a third embodiment, the correlations can be calculated online (i.e. in real-time) by only generating the SSS sequences that are in the top X results of the set and only calculating the correlation coefficients for these, where X is an integer value greater than zero, i.e. X>0, but less than the total number of results (i.e. in the first correlation, this may be 168 which corresponds to the total number of SSS sequence templates). In another embodiment, only the correlations for those metrics with a value greater than zero would be calculated in real time. For example, if this embodiment is applied to our previous example using templates A-E, only the correlation coefficient for D and E would need to be calculated online for the second iteration of the process.

Figure 6:
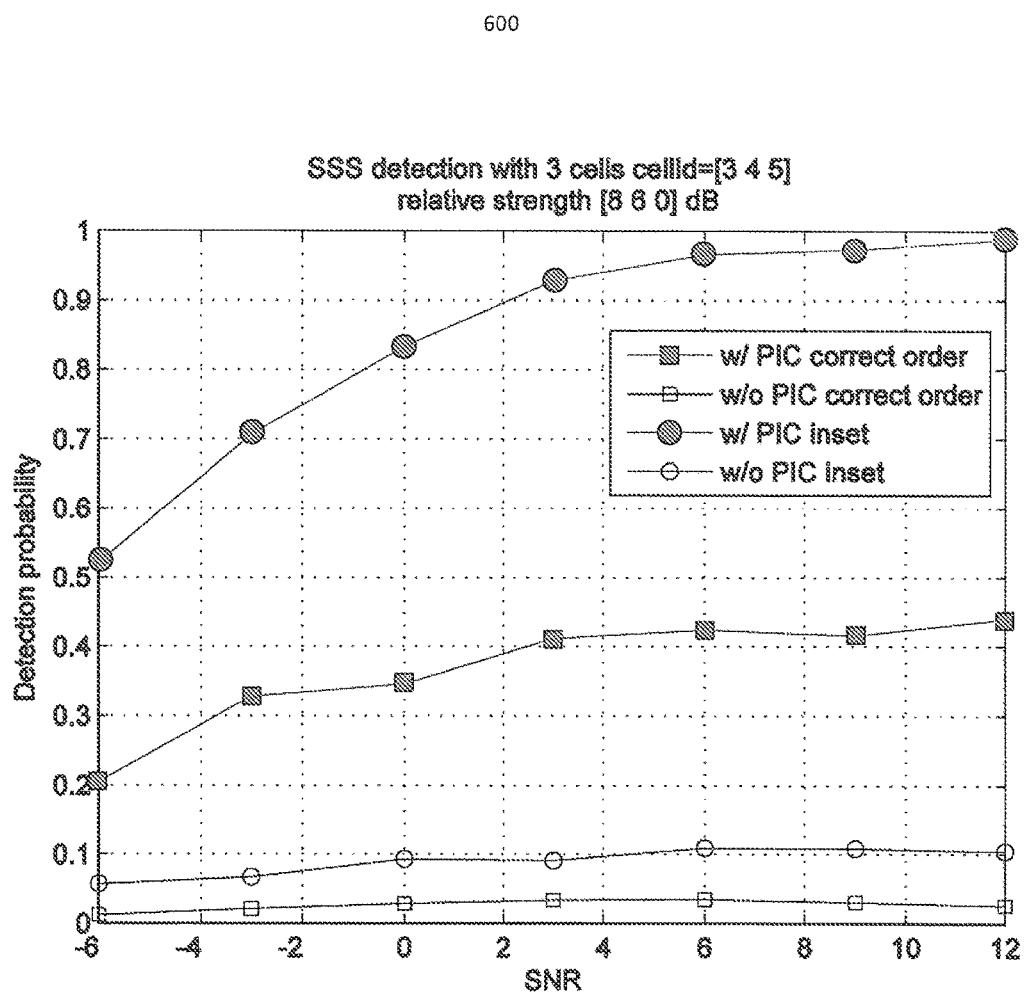
FIG. 6 shows a graph with simulation results of this disclosure.

FIG. 6 shows a graph 600 depicting the cell detection probability in interference dominated scenarios when the PIC as disclosed herein is implemented.

As shown in graph 600, the PIC in this disclosure demonstrate spectacular results in cell detection in interference dominated scenarios when compared to the algorithm which does not implement the PIC of this disclosure. Detection is defined if the 3 cells are reported as the 3 highest results with some distinction made if the order reflects the relative cell strengths, [8 6 0] dBs for cellIds [3 4 5], respectively.

FIG. 7 shows a flowchart 700 showing an aspect of this disclosure in which a device may perform an interference cancellation. It is appreciated that flowchart 700 is exemplary in nature and may thus be simplified for purposes of this explanation.

In 702, the device correlates a signal received at the communication device with a template comprising one or more signal sequences associated with one or more corresponding cells to determine a metric for each of the signal sequences.

In 704, the device ranks the signal sequences based on the determined metrics, wherein the highest ranked signal sequence is designated as an aggressor sequence.

In 706, the device performs an interference cancellation for each signal sequence to generate a corrected metric for signal sequences based on their correlation with the aggressor sequence. The correlations of all the signal sequences on the template may be stored in a memory component accessible by the communication device.

In 708, the device removes the signal sequence with the highest ranked metric and sets priority to the cell associated with the aggressor sequence.

The device may be further configured to repeat 704-708 with the remaining sequences. In this manner, in each iteration, the highest ranked metric is determined (in each subsequent iteration, this will be a corrected metric) and the interference cancellation is performed with respect to the highest ranked metric in that particular iteration. The priority of cells is then set in accordance with the removal order of the signal sequences associated with the cells, i.e. the cell associated with the signal sequence removed in the first iteration is first, the cell associated with the signal sequence in the second iteration is second, etc.

The iterations described in 704-708 may be repeated until a termination condition is met. This termination condition may be predetermined, for example, a certain number of iterations.

In Example 1, a method adapted for interference cancellation in a cell search used in a communication device, including correlating a signal received at the communication device with a template comprising one or more signal sequences associated with one or more corresponding cells to determine a metric for each of the signal sequences, and at least a first iteration of: ranking the signal sequences based on the determined metrics, wherein the highest ranked signal sequence is designated as an aggressor sequence; performing an interference cancellation to generate a corrected metric for signal sequences based on their correlation with the aggressor sequence; and removing the aggressor sequence and setting priority to the cell associated with the aggressor sequence for the cell search.

In Example 2, the subject matter of Example 1 may include performing subsequent iterations wherein each subsequent iteration comprises: ranking the remaining signal sequences based on the corrected metrics calculated in the previous iteration, wherein the highest ranked remaining signal sequence is designated as a subsequent aggressor sequence; performing an interference cancellation to generate subsequent corrected metrics for signal sequences based on their correlation with the subsequent aggressor sequence; and removing the subsequent aggressor sequence and setting priority to the cell associated with the subsequent aggressor sequence below the cell associated with the previously removed aggressor sequence in the cell search.

In Example 3, the subject matter of Example 2 may include repeating the subsequent iterations until a termination condition is met.

In Example 4, the subject matter of Example 3 may include wherein the termination condition is a predetermined number of iterations.

In Example 5, the subject matter of Example 4 may include wherein the predetermined number of iterations is no more than about twenty.

In Example 6, the subject matter of one of Examples 1-5 may include determining a base correlation among each of the signal sequences in the template in parallel to or prior to receiving the signal.

In Example 7, the subject matter of Example 6 may include storing the base correlations in a memory component of the communication device.

In Example 8, the subject matter of Examples 6-7 may include only storing high base correlation template values.

In Example 9, the subject matter of Examples 7-8 may include wherein the correlation between the particular signal sequence and the aggressor sequence in the interference cancellation is the base correlation between said two sequences stored in the memory component.

In Example 10, the subject matter of Examples 1-5 may include calculating the correlation between a respective signal sequence and the aggressor sequence in real time.

In Example 11, the subject matter of Example 10 may further include wherein no more than about twenty corrected metrics between signal sequences and the aggressor sequence are calculated in each iteration.

In Example 12, the subject matter of Examples 1-11 may include wherein the signal is a Secondary Synchronization Signal (SSS).

In Example 13, the subject matter of Example 12 may include wherein the one or more signal sequences comprise SSS sequences.

In Example 14, the subject matter of Examples 1-13 may include first receiving a Primary Synchronization Signal (PSS).

In Example 15, the subject matter of Example 14 may include wherein a sector ID and timing synchronization are acquired by the communication device with the PSS reception.

In Example 16, the subject matter of Example 15 may include wherein the PSS reception determines which signal sequences are correlated with the received signal.

In Example 17, a circuit arrangement configured for interference cancellation in a cell search, including: a correlator circuit configured to correlate a signal received at the circuit arrangement with a template comprising a one or more signal sequences associated with a one or more corresponding cells, to determine a metric for each signal sequence; a sorting circuit configured to rank the signal sequences based on the determined metrics, wherein the highest ranked signal sequence is designated as an aggressor sequence; an interference cancellation circuit configured to generate a corrected metric for signal sequences based on their correlation with the aggressor sequence; and a removal circuit configured to remove the aggressor sequence and set priority to the cell associated with the aggressor sequence in the cell search.

In Example 18, the subject matter of Example 17 may include a reception circuit configured to receive the signal.

In Example 19, the subject matter of Examples 17-18 may include the circuit arrangement configured to perform subsequent iterations of: ranking the remaining signal sequences based on the corrected metrics calculated in the previous iteration, wherein the highest ranked remaining signal sequence is designated as a subsequent aggressor sequence; performing an interference cancellation to generate subsequent corrected metrics for signal sequences based on their correlation with the subsequent aggressor sequence; and removing the subsequent aggressor sequence and setting priority to the cell associated with the subsequent aggressor sequence below the cell associated with the previously removed aggressor sequence in the cell search.

In Example 20, the subject matter of Example 19 may include a termination circuit configured to terminate the subsequent iterations once a termination condition has been met.

In Example 21, the subject matter of Example 20 may include wherein the termination condition is a predetermined number of iterations.

In Example 22, the subject matter of Example 21 may include wherein the predetermined number of iterations is nor more than about twenty.

In Example 23, the subject matter of Examples 17-22 may include a pre-correlation circuit configured to determine a base correlation among each of the signal sequences in the template in parallel to or prior to receiving the signal.

In Example 24, the subject matter of Example 23 may include a storage circuit configured to store the base correlations.

In Example 25, the subject matter of Example 24 may include the storage circuit configured to store only high base correlation template values. In other words, only the templates with the highest X correlation values are stored, where X is any number less than the total number of correlations in the comprehensive 168×168 correlation matrix. In this case, there may be some performance loss since the correlation matrix is not as extensive as in the first embodiment. For example, only the templates with the highest 84, or 42, or 21 or any number less than 84, correlation values are stored.

In Example 26, the subject matter of Examples 17-22 may include the interference cancellation circuit further configured to calculate the correlation between a respective signal sequence and the aggressor sequence in real time.

In Example 27, the subject matter of Example 26 may include the interference cancellation circuit further configured to generate corrected metrics for no more than about twenty signal sequences in each iteration.

In Example 28, the subject matter of Examples 17-27 may include wherein the signal is a Secondary Synchronization Signal (SSS).

In Example 29, the subject matter of Example 28 may include wherein the one or more signal sequences comprise SSS sequences.

In Example 30, the subject matter of Examples 18-29 may include the reception circuit configured to first receive a Primary Synchronization Signal (PSS).

In Example 31, the subject matter of Example 30 may include wherein a sector ID and timing synchronization are acquired with the reception of the PSS.

In Example 32, the subject matter of Examples 30-31 may include wherein the PSS reception determines which signal sequences on the template are correlated with the received signal.

In Example 33, a communication device configured to perform a cell search, including: a transceiver configured to receive a signal; a baseband modem comprising circuitry configured to: correlate a signal received at the circuit arrangement with a template comprising a one or more signal sequences associated with a one or more corresponding cells to determine a metric for each signal sequence; rank the signal sequences based on the determined metrics, wherein the highest ranked signal sequence is designated as an aggressor sequence; generate a corrected metric for signal sequences based on their correlation with the aggressor sequence; and remove the aggressor sequence and set priority to the cell associated with the aggressor sequence in the cell search.

In Example 34, the subject matter of Example 33 may include the baseband modem further configured to perform subsequent iterations of: ranking the remaining signal sequences based on the corrected metrics calculated in the previous iteration, wherein the highest ranked remaining signal sequence is designated as a subsequent aggressor sequence; performing an interference cancellation to generate subsequent corrected metrics for signal sequences based on their correlation with the subsequent aggressor sequence; and removing the subsequent aggressor sequence and setting priority to the cell associated with the subsequent aggressor sequence below the cell associated with the previously removed aggressor sequence in the cell search.

In Example 35, the subject matter of Example 34 may include the baseband modem further comprising circuitry configured to terminate the subsequent iterations once a termination condition has been met.

In Example 36, the subject matter of Example 35 may include wherein the termination condition is a predetermined number of iterations.

In Example 37, the subject matter of Example 36 may include wherein the predetermined number of iterations is nor more than about twenty.

In Example 38, the subject matter of Examples 33-37 may include the baseband modem further comprising circuitry configured to determine a base correlation among each of the signal sequences in the template in parallel to or prior to the communication device receiving the signal.

In Example 39, the subject matter of Example 38 may include a memory configured to store the base correlations.

In Example 40, the subject matter of Example 39 may include the memory further configured to store configured to high base correlation template values.

In Example 41, the subject matter of Examples 33-37 may include the baseband modem comprising circuitry configured to calculate the correlation between a respective signal sequence and the aggressor sequence in real time.

In Example 42, the subject matter of Example 41 may include the baseband modem further configured to generate corrected metrics for no more than about twenty signal sequences in each iteration.

In Example 43, the subject matter of Example 33-42 may include wherein the signal is a Secondary Synchronization Signal (SSS).

In Example 44, the subject matter of Example 43 may include wherein the one or more signal sequences comprise SSS sequences.

In Example 45, the subject matter of Example 33-44 may include the transceiver configured to receive a Primary Synchronization Signal (PSS) prior to receiving the signal.

In Example 46, the subject matter of Example 45 may include wherein a sector ID and timing synchronization are acquired with the reception of the PSS.

In Example 47, the subject matter of Examples 45-46 may include wherein the PSS reception determines which signal sequences are correlated with the received signal.

In Example 48, a non-transitory computer readable medium with program instructions which when executed cause a processor of a device to perform a cell search, including: correlating a signal received at the communication device with a template comprising one or more signal sequences associated with one or more corresponding cells to determine a metric for each of the signal sequences, and at least a first iteration of: ranking the signal sequences based on the determined metrics, wherein the highest ranked signal sequence is designated as an aggressor sequence; performing an interference cancellation to generate a corrected metric for signal sequences based on their correlation with the aggressor sequence; and removing the aggressor sequence and setting priority to the cell associated with the aggressor sequence in the cell search.

In Example 49, the subject matter of Example 48 may include subsequent iterations wherein each subsequent iteration includes: ranking the remaining signal sequences based on the corrected metrics calculated in the previous iteration, wherein the highest ranked remaining signal sequence is designated as a subsequent aggressor sequence; performing an interference cancellation to generate subsequent corrected metrics for signal sequences based on their correlation with the subsequent aggressor sequence; and removing the subsequent aggressor sequence and setting priority to the cell associated with the subsequent aggressor sequence below the cell associated with the previously removed aggressor sequence in the cell search.

In Example 50, the subject matter of Example 49 may include repeating the subsequent iterations until a termination condition is met.

In Example 51, the subject matter of Example 50 may include wherein the termination condition is a predetermined number of iterations.

In Example 52, the subject matter of Example 51 may include wherein the predetermined number of iterations is no more than about twenty.

In Example 53, the subject matter of Examples 48-52 may include determining a base correlation among each of the signal sequences in the template in parallel to or prior to receiving the signal.

In Example 54, the subject matter of Example 53 may include storing the base correlations in a memory component of the communication device.

In Example 55, the subject matter of Examples 53-54 may include only storing high base correlation template values.

In Example 56, the subject matter of Example 54-55 may include wherein the correlation between the particular signal sequence and the aggressor sequence in the interference cancellation is the base correlation between said two sequences stored in the memory component.

In Example 57, the subject matter of Examples 48-52 may include calculating the correlation between a respective signal sequence and the aggressor sequence in real time.

In Example 58, the subject matter of Example 39 may include wherein no more than about twenty corrected metrics between signal sequences and the aggressor sequence are calculated in each iteration.

In Example 59, the subject matter of Example 48-58 may include wherein the signal is a Secondary Synchronization Signal (SSS).

In Example 60, the subject matter of Example 59 may include wherein the one or more signal sequences comprise SSS sequences.

In Example 61, the subject matter of Examples 48-60 may include further comprising first receiving a Primary Synchronization Signal (PSS).

In Example 62, the subject matter of Example 61 may include wherein a sector ID and timing synchronization are acquired by the communication device with the PSS reception.

In Example 63, the subject matter of Example 62 may include wherein the PSS reception determines which signal sequences are correlated with the received signal.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement configured for interference cancellation in a cell search, comprising:
    a correlator circuit configured to correlate a signal received at the circuit arrangement with a template comprising a one or more signal sequences associated with a one or more corresponding cells, to determine a metric for each signal sequence;
    a sorting circuit configured to rank the signal sequences based on the determined metrics, wherein the highest ranked signal sequence is designated as an aggressor sequence;
    an interference cancellation circuit configured to generate a corrected metric for signal sequences based on their correlation with the aggressor sequence; and
    a removal circuit configured to remove the aggressor sequence and set priority to the cell associated with the aggressor sequence in the cell search.

2. The circuit arrangement of claim 1, further comprising a reception circuit configured to receive the signal.

3. The circuit arrangement of claim 2, further comprising the reception circuit configured to first receive a Primary Synchronization Signal (PSS).

4. The circuit arrangement of claim 3, wherein the PSS determines which signal sequences on the template are correlated with the received signal.

5. The circuit arrangement of claim 1, the circuit arrangement configured to perform subsequent iterations of:
    ranking the remaining signal sequences based on the corrected metrics calculated in the previous iteration, wherein the highest ranked remaining signal sequence is designated as a subsequent aggressor sequence;
    performing an interference cancellation to generate subsequent corrected metrics for signal sequences based on their correlation with the subsequent aggressor sequence; and
    removing the subsequent aggressor sequence and setting priority to the cell associated with the subsequent aggressor sequence below the cell associated with the previously removed aggressor sequence in the cell search.

6. The circuit arrangement of claim 5, further comprising a termination circuit configured to terminate the subsequent iterations once a termination condition has been met.

7. The circuit arrangement of claim 6, wherein the termination condition is a predetermined number of iterations.

8. The circuit arrangement of claim 1, further comprising a pre-correlation circuit configured to determine a base correlation among each of the signal sequences in the template in parallel to or prior to receiving the signal.

9. The circuit arrangement of claim 8, further comprising a storage circuit configured to store the base correlations.

10. The circuit arrangement of 7, the storage circuit configured to store only high base correlation template values.

11. The circuit arrangement of claim 1, the interference cancellation circuit further configured to calculate the correlation between a respective signal sequence and the aggressor sequence in real time.

12. The circuit arrangement of claim 11, the interference cancellation circuit further configured to generate corrected metrics for no more than about twenty signal sequences in each iteration.

13. The circuit arrangement of claim 1, wherein the signal is a Secondary Synchronization Signal (SSS).

14. A communication device configured to perform a cell search, comprising:
   a transceiver configured to receive a signal;
   a baseband modem comprising circuitry configured to:
   correlate a signal received at the circuit arrangement with a template comprising a one or more signal sequences associated with a one or more corresponding cells to determine a metric for each signal sequence;
   rank the signal sequences based on the determined metrics, wherein the highest ranked signal sequence is designated as an aggressor sequence;
   generate a corrected metric for signal sequences based on their correlation with the aggressor sequence; and
   remove the aggressor sequence and set priority to the cell associated with the aggressor sequence in the cell search.

15. The communication device of claim 14, the baseband modem further configured to perform subsequent iterations of:
   ranking the remaining signal sequences based on the corrected metrics calculated in the previous iteration, wherein the highest ranked remaining signal sequence is designated as a subsequent aggressor sequence;
   performing an interference cancellation to generate subsequent corrected metrics for signal sequences based on their correlation with the subsequent aggressor sequence; and
   removing the subsequent aggressor sequence and setting priority to the cell associated with the subsequent aggressor sequence below the cell associated with the previously removed aggressor sequence in the cell search.

16. The communication device of claim 15, the baseband modem further comprising circuitry configured to terminate the subsequent iterations once a termination condition has been met.

17. A method adapted for interference cancellation in a cell search used in a communication device, comprising:
   correlating a signal received at the communication device with a template comprising one or more signal sequences associated with one or more corresponding cells to determine a metric for each of the signal sequences, and at least a first iteration of:
   ranking the signal sequences based on the determined metrics, wherein the highest ranked signal sequence is designated as an aggressor sequence;
   performing an interference cancellation to generate a corrected metric for signal sequences based on their correlation with the aggressor sequence; and
   removing the aggressor sequence and setting priority to the cell associated with the aggressor sequence for the cell search.

18. The method of claim 17, further comprising subsequent iterations wherein each subsequent iteration comprises:
   ranking the remaining signal sequences based on the corrected metrics calculated in the previous iteration, wherein the highest ranked remaining signal sequence is designated as a subsequent aggressor sequence;
   performing an interference cancellation to generate subsequent corrected metrics for signal sequences based on their correlation with the subsequent aggressor sequence; and
   removing the subsequent aggressor sequence and setting priority to the cell associated with the subsequent aggressor sequence below the cell associated with the previously removed aggressor sequence in the cell search.

19. The method of claim 18, further comprising repeating the subsequent iterations until a termination condition is met.

20. The method of claim 19, wherein the termination condition is a predetermined number of iterations.

21. The method of claim 17, further comprising determining a base correlation among each of the signal sequences in the template in parallel to or prior to receiving the signal.

22. The method of claim 17, further comprising calculating the correlation between a respective signal sequence and the aggressor sequence in real time.

23. A non-transitory computer readable medium with program instructions which when executed cause a processor of a device to perform a cell search, comprising:
   correlating a signal received at the communication device with a template comprising one or more signal sequences associated with one or more corresponding cells to determine a metric for each of the signal sequences, and at least a first iteration of:
   ranking the signal sequences based on the determined metrics, wherein the highest ranked signal sequence is designated as an aggressor sequence;
   performing an interference cancellation to generate a corrected metric for signal sequences based on their correlation with the aggressor sequence; and
   removing the aggressor sequence and setting priority to the cell associated with the aggressor sequence in the cell search.

24. The non-transitory computer readable medium of claim 23, further comprising subsequent iterations wherein each subsequent iteration comprises:
   ranking the remaining signal sequences based on the corrected metrics calculated in the previous iteration, wherein the highest ranked remaining signal sequence is designated as a subsequent aggressor sequence;
   performing an interference cancellation to generate subsequent corrected metrics for signal sequences based on their correlation with the subsequent aggressor sequence; and
   removing the subsequent aggressor sequence and setting priority to the cell associated with the subsequent aggressor sequence below the cell associated with the previously removed aggressor sequence in the cell search.

25. The non-transitory computer readable medium of claim 24, further comprising repeating the subsequent iterations until a termination condition is met.

\* \* \* \* \*